United States Patent [19]

Wax

[11] Patent Number: 4,976,013
[45] Date of Patent: Dec. 11, 1990

[54] ROPE-TYING DEVICE AND METHOD
[75] Inventor: Cyrus T. Wax, Skokie, Ill.
[73] Assignee: Scully-Jones, Corp., Chicago, Ill.
[21] Appl. No.: 476,327
[22] Filed: Feb. 7, 1990
[51] Int. Cl.$^5$ ............................................. F16G 11/00
[52] U.S. Cl. .................................. 24/129 R; 24/129 A
[58] Field of Search ................. 24/129 R, 129 A, 128, 24/115 H, 115 J; 114/218, 230; 403/206, 209

[56] References Cited

U.S. PATENT DOCUMENTS

| | | |
|---|---|---|
| 535,680 | 3/1895 | Davis . |
| 666,400 | 1/1901 | Tregoning ........................ 24/129 A |
| 749,847 | 1/1904 | Curtis . |
| 903,240 | 11/1908 | Smith ................................ 24/129 R |
| 947,111 | 1/1910 | Lorentz ............................. 24/129 R |
| 1,053,593 | 2/1913 | Gould . |
| 1,718,641 | 6/1929 | Forman . |
| 1,828,350 | 12/1930 | Williams . |
| 2,316,511 | 4/1943 | Flournoy .......................... 24/129 R |
| 3,094,755 | 6/1963 | Casanave . |
| 4,114,553 | 9/1978 | Bidek .................................... 114/230 |
| 4,414,712 | 11/1983 | Beggins . |
| 4,785,509 | 11/1988 | Fisher ................................ 24/129 R |
| 4,872,240 | 10/1989 | Spinner et al. . |

Primary Examiner—Victor N. Sakran
Attorney, Agent, or Firm—Dressler, Goldsmith, Shore, Sutker & Milnamow

[57] ABSTRACT

A rope-tying device is disclosed which facilitates convenient and efficient formation of a loop in the free end portion of a rope. Economical fabrication and efficient use of the device is facilitated by its configuration as a unitary, generally cylindrical tubular body formed from a single piece of material. The tubular defines a pair of diametrically opposed, longitudinally extending slots, with the body including a pair of annular end body portions, and a pair of diametrically opposed side body portions extending between the end body portions. For loop-formation, the free end portion of a rope is inserted through the device, and a half-loop displaced laterally through one of the slots. The free end of the rope is thereafter inserted through the half-loop, with tension exerted to complete loop-formation.

3 Claims, 1 Drawing Sheet

U.S. Patent    Dec. 11, 1990    4,976,013
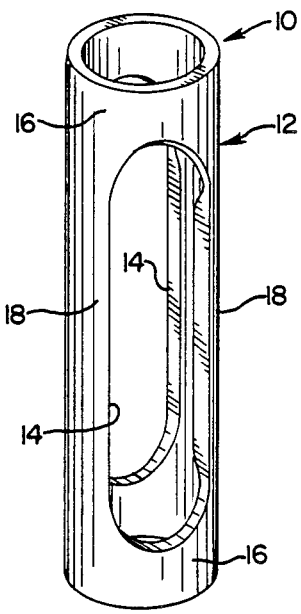
Fig_1_
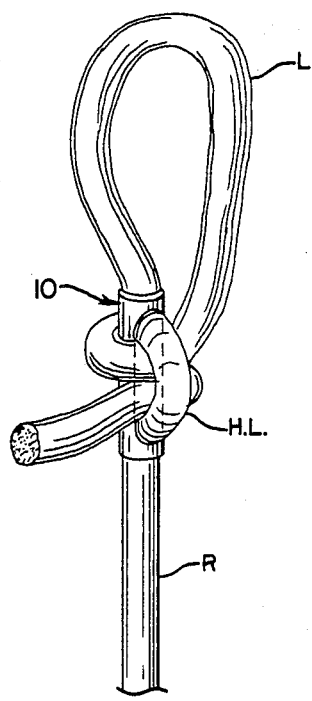
Fig_5_
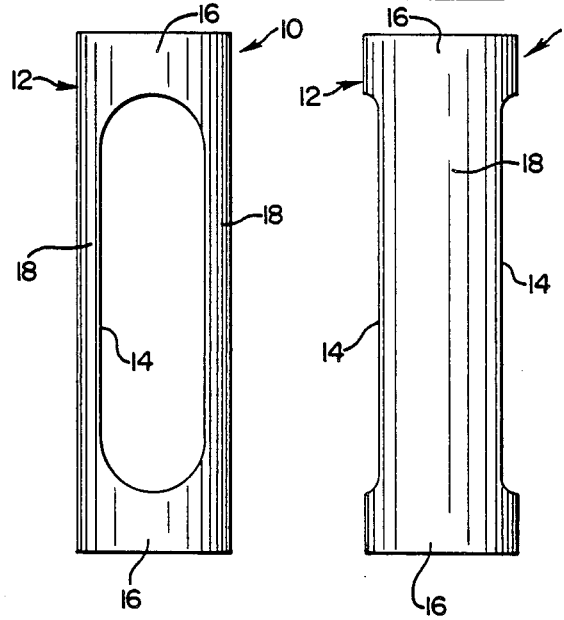
Fig_2_   Fig_3_
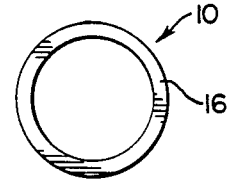
Fig_4_

4,976,013

ROPE-TYING DEVICE AND METHOD

TECHNICAL FIELD

The present invention relates generally to devices for tying ropes, and more particularly to a device for forming a load-carrying loop in the free end portion of a rope, without resort to conventional splicing or the like.

BACKGROUND OF THE INVENTION

Typical applications for ropes, lines, and other like flexible, load-carrying articles frequently require formation of a stable, load-carrying loop at a free end portion of the rope. For example, in marine applications, formation of a stable loop is typically required for mooring, towing, hoisting, and like operations. Of course, applications apart from marine uses similarly require stable loop-formation.

Despite the widespread need for typical loop-formation, methods for providing such loops have heretofore been relatively inconvenient or cumbersome to employ. For example, in the case of braided or twisted rope, loop-formation can be effected by a woven splice, but this requires the particular knowledge of the necessary weaving technique, and can be quite time-consuming (typically 5-10 minutes) to complete. Moreover, some braided ropes cannot be spliced.

While mechanical devices, such as clamps and the like can be fitted to ropes for loop-formation, such devices typically require the use of associated tools, may be subject to corrosion (particularly in marine application), and are similarly time-consuming to properly fit.

U.S. Pat. No. 4,872,240, to Spinner et al., contemplates a loop-forming device which provides some advantages over previous approaches, but which nevertheless suffers from distinct deficiencies in its performance, and its economical application. The device of this patent includes a pair of end rings between which extend two or three unevenly spaced bars. For use, a rope is inserted through the end rings of the device, and then manipulated so that a portion of the rope extends between the unevenly spaced bars. A loop is thereafter formed generally by wrapping the rope around the bars of the device.

The principal drawback of the device of this patent relates to its inability to be relatively economically formed. Each of the end rings of the device are disclosed as comprising ring-shaped elements formed from material having a circular cross-section, while each of the unevenly spaced bars are illustrated and specified as being of a rounded configuration. As a consequence, the device does not at all lend itself to economic formation from metallic materials, by virtue of the extensive metal working required to appropriately fit the bar components to the end rings, nor does the device lend itself to manufacture by molding, without resort to extremely complex and expensive molding devices having collapsible elements and the like.

Moreover, this patent states that the specified uneven spacing of the bar elements is intended to facilitate use with different size ropes. However, it is believed that this uneven spacing can undesirably lead to confusion by users as to the correct use of the device, and moreover, can undesirably result in possible deformation due to the inevitable uneven loading of the asymmetrical (relative to the longitudinal axis) construction.

The present invention contemplates a desirably straightforward and readily manufactured rope-tying device which facilitates convenient and efficient loop-formation in ropes and like flexible elements.

SUMMARY OF THE INVENTION

The rope-tying device embodying the principles of the present invention has been desirably configured for highly economical manufacture, and very convenient and efficient use. To this end, the device can be very economically formed from a single piece of material, thus avoiding the attendant expense of fabrication required by prior art devices, and at the same time provides a construction with highly efficient load-carrying capabilities for reliable, dependable use for a wide range of applications.

In accordance with the illustrated embodiment, the present rope-tying device comprises a unitary tubular body formed of a single piece of material, which in the preferred form desirably lends itself to economical manufacture from a metallic tubular element, or economical molding without resort to complex molding devices.

The unitary tubular body is preferably of a generally cylindrical configuration, and defines an inside cross-sectional area large enough to receive therethrough a free end portion of an associated rope.

The tubular body of the device defines a pair of longitudinally extending, spaced apart slots, which in the preferred form, are disposed opposite each other relative to the longitudinal axis of the tubular body. When the tubular body is provided in the preferred cylindrical form, the longitudinally extending slots are diametrically opposed.

The disposition of the slots is such that the tubular body includes a pair of annular end body portions at respective opposite ends of the pair of slots, and a pair of spaced apart side body portions each extending between the end body portions, in alternating relationship with the slots. In other words, each of the slots extends between opposed edge portions of the side body portions.

Each of the longitudinal slots is sufficiently large so as to receive a half-loop of the rope, laterally from within the tubular body, through either selected one of the slots. In this manner, the formation of a loop with the free end portion of the rope that extends through and beyond the tubular body is facilitated.

As noted, in the preferred embodiment, the tubular body is generally cylindrical, and the longitudinal slots being diametrically opposed, with this resultant construction enhancing the load-bearing characteristics of the device, as well as facilitating economical formation. In this preferred form, each annular end body portion comprises a cylinder, while each of the side body portions comprises a cylindrical section.

To facilitate convenient use, it is presently preferred that the side body portions are identically configured. In the preferred form, the longitudinal slots are each straight-sided, and each longitudinally centered with respect to the length of the tubular body. In a particularly preferred form, each of the slots has a length about equal to 4 times the nominal diameter of the free end portion of the associated rope.

In keeping with the preferred embodiment, the tubular body of the device defines an inside diameter about equal to 1.13 times the nominal diameter of the free end portion of the rope, with the tubular body further defining an outside diameter about equal to 1.44 times the nominal diameter of the rope.

Other features and advantages of the present invention will become readily apparent from the following detailed description, the accompanying drawings, and the appended claims.

BRIEF DESCRIPTION OF THE DRAWINGS

FIG. 1 is a perspective view of the rope-tying device embodying principles of the present invention;

FIGS. 2 and 3 are side elevational views of the rope-tying device shown in FIG. 1;

FIG. 4 is an end view of the present rope-tying device; and

FIG. 5 is a perspective view of the manner in which the present rope-tying device is used in conjunction with the free end portion of an associated rope for forming a stable, load-carrying loop therein.

DETAILED DESCRIPTION

While the present invention is susceptible of embodiment in various forms, there is shown in the drawings and will hereinafter be described a presently preferred embodiment, with the understanding that the present disclosure is to be considered as an exemplification of the invention, and is not intended to limit the invention to the specific embodiment illustrated.

Referring now to the drawings, therein is illustrated a rope-tying device 10 embodying the principles of the present invention. As will be further described, the present rope-tying device facilitates very convenient formation of a stable, load-carrying loop, designated L in FIG. 5, in the free end portion of an associated rope R.

In accordance with the preferred embodiment, rope-tying device 10 comprises a unitary and one-piece tubular body 12 formed from a single piece of material (including molding as a single piece). In the preferred form, tubular body 12 is of a generally cylindrical configuration, thus greatly facilitating economical formation of the present device from either tubular material (either metallic or non-metallic), or by injection-molding or like forming techniques.

The tubular body 12 defines an inside crosssectional area which is large enough to receive the free end portion of the associated rope therethrough. In the preferred form, the rope-tying device 10 is configured for use with a rope of a specified diameter, thus assuring its stability in use, and without any confusion by users as to the correct manner in which it is employed, thereby providing distinct advantages over previously-known constructions.

In order to promote use in the intended manner, tubular body 12 defines a pair of longitudinally extending, spaced apart slots 14, with the tubular body 12 thereby including a pair of annular end body portions 16 at respective opposite ends of the pair of slots, and a pair of spaced apart, side body portions 18 each extending between the end body portions. As illustrated, the side body portions 18 are arranged in alternating relationship with the slots 14, i.e., each of the slots 14 extends between opposed and confronting edge portions of side body portions 18.

Features of the preferred, illustrated embodiment lend to the structural integrity of the rope-tying device 10. As noted, tubular body 12 is preferably of a generally cylindrical form, with the annular end body portions 16 thus each comprising a cylinder, and the side body portions 18 each comprising a cylindrical section.

Further in accordance with the preferred form, each of the longitudinal slots 14 is straight-sided, and longitudinally-centered with respect to the length of the tubular body 12. To facilitate the intended disposition of a half-loop of rope by manual lateral displacement from within the tubular body, each of the slots 14 preferably has a length about equal to 4 times the nominal diameter of the free end portion of the associated rope, with each of the slots having a transverse dimension (between the edges of side body portions 18 on either side thereof) about equal to the nominal diameter of the rope.

In order to provide the desired fit of the rope-tying device 10 to the associated rope, without excessive free-play, the tubular body 12 preferably defines an inside diameter about equal to 1.13 times the nominal diameter of the free end portion of the rope. In order to provide the tubular body with sufficient strength, its outside diameter is preferably about equal to 1.44 times the nominal diameter of the rope.

Referring now to FIG. 5, the method of using the present rope-tying device 10 for forming a loop in the free end portion of a rope is illustrated. As will be appreciated, the preferred diametrically opposed disposition of the longitudinal slots 14 facilitates convenient use of the device, in the following manner.

For loop-formation, the free end portion of the rope is inserted through and beyond the tubular body 12 by guiding the rope through both of the end body portions 16. A sufficient length of the free end portion is pulled through the device to facilitate formation of a loop of the desired size.

Next, a half-loop of the free end portion is manually displaced laterally from within the tubular body of the device through a selected one of either of the slots 14 defined thereby. Notably, this can be readily achieved by manually pushing the half-loop by insertion of a user's finger through the other of the longitudinal slots 14. Again, either of the slots 14 can receive the half-loop, designated HL in FIG. 5, with the other of the slots being positioned and configured for convenient manipulation of the half-loop.

A loop is then formed in the portion of the rope which extends beyond the rope-tying device 10 by first inserting the free end of the rope through the half-loop HL, then about the tubular body 12, and once again through the half-loop. The rope then generally appears as in FIG. 5.

Finally, tension is exerted on the rope so that the half-loop frictionally grips the portions of the rope inserted therethrough. In this manner, the loop assumes a stable, load-carrying configuration. Remarkably, testing has shown that the load-carrying capacity of a loop formed with the present device is comparable to the load-carrying capacity of the rope itself.

From the foregoing, it will be observed that numerous modifications and variations can be effected without departing from the true spirit and scope of the novel concept of the present invention. It is to be understood that no limitation with respect to the specific embodiment is intended or should be inferred. The disclosure is intended to cover, by the appended claims, all such modifications as fall within the scope of the claims.

What is claimed is:

1. A rope-tying device for forming a loop in the free end portion of a rope, comprising:
a unitary, generally cylindrical tubular body formed of a single piece of material and defining an inside cross-section area large enough to receive said free end portion of said rope therethrough, said tubular body defining a pair of longitudinally extending, diametrically opposed, spaced apart slots, said tubular body thereby including a pair of annular, cylindrical end body portions at respective opposite ends of said pair of slots, and each having a substantially constant inside diameter through which said rope in insertable, and a pair of diametrically opposed, spaced apart side body portion each extending between said end body portion in alternating relationship with said slots, each of said side body portions comprising a cylindrical section;

each of said slots being straight-sided, and longitudinally-centered with respect to the length of said tubular body, each said slot having a transverse dimension substantially equal to the nominal diameter of said free end portion of said rope, and a length substantially equal to 4 times the nominal diameter of said free end portion of said rope, so that each said slot extends along a major portion of the length of said tubular body and is sufficiently large so as to receive a half-loop of said rope laterally from within said tubular body, through either selected one of said slots to thereby facilitate formation of said loop with the free end portion of said rope that extends through and beyond said tubular body.

2. A rope-tying device in accordance with claim 1, wherein
said tubular body defines an inside diameter about equal to 1.13 times the nominal diameter of said free end portion of said rope, and defines an outside diameter about equal to 1.44 times the nominal diameter of said rope.

3. A method of forming a loop in the free end portion of a rope, comprising the steps of:
providing the rope-tying device in accordance with claim 1;
inserting said free end portion of said rope through and beyond said rope-tying device;
manually displacing a half-loop of said free end portion laterally from within said rope-tying device through a selected one of either of said slots by manually pushing said half-loop by insertion of a user's finger through the other of said slots;
forming a loop in the portion of said rope extending beyond said rope-tying device by inserting the free end of the rope through said half-loop, about said tubular body, and once again through said half-loop, and
exerting tension on said rope so that said half-loop frictionally grips the portions of said rope inserted therethrough, with said loop thereby assuring a stable, load-carrying configuration.

* * * * *

UNITED STATES PATENT AND TRADEMARK OFFICE
CERTIFICATE OF CORRECTION

PATENT NO. : 4,976,013
DATED : December 11, 1990
INVENTOR(S) : Cyrus T. Wax

It is certified that error appears in the above-identified patent and that said Letters Patent is hereby corrected as shown below:

In The Abstract:

Line 7, after "The tubular", insert --body--;

Line 15, after "half-loop", insert --about the tubular body, and once again through the half-loop--.

Signed and Sealed this

Twenty-eighth Day of April, 1992

Attest:

HARRY F. MANBECK, JR.

*Attesting Officer*  *Commissioner of Patents and Trademarks*